United States Patent [19]

Sakamoto

[11] Patent Number: 5,200,776
[45] Date of Patent: Apr. 6, 1993

[54] LENS BARREL FOR CAMERA
[75] Inventor: Satoshi Sakamoto, Tokyo, Japan
[73] Assignee: Sony Corporation, Japan
[21] Appl. No.: 698,842
[22] Filed: May 13, 1991
[30] Foreign Application Priority Data May 21, 1990 [JP] Japan .................................. 1-130580

[51] Int. Cl.⁵ .............................................. G03B 1/18
[52] U.S. Cl. .............................. 354/195.12; 310/68 B
[58] Field of Search ...................... 354/195.1, 400, 286,
354/195.12; 359/811, 819, 822, 823, 824;
310/68 B; 338/32 R

[56] References Cited
U.S. PATENT DOCUMENTS

| 4,002,405 | 1/1977 | Stahl | 354/195.12 |
| 4,534,624 | 8/1985 | Toda et al. | 354/195.12 |
| 4,676,605 | 6/1987 | Toda et al. | 354/195.12 |
| 4,845,456 | 7/1989 | Abe et al. | 338/32 R |
| 5,061,952 | 10/1991 | Ogawa | 354/400 |
| 5,078,472 | 1/1992 | Sugawara | 354/195.12 |

FOREIGN PATENT DOCUMENTS 0458694 11/1991 European Pat. Off. .
2306459 10/1976 France .

OTHER PUBLICATIONS

Patent Abstracts of Japan, vol. 13, No. 375 of Aug. 21, 1989.
Patent Abstracts of Japan, vol. 12, No. 216 of Jun. 21, 1988.
Patent Abstracts of Japan vol. 14, No. 25 of Jan. 18, 1990.

Primary Examiner—Donald A. Griffin
Assistant Examiner—David M. Gray
Attorney, Agent, or Firm—Ronald P. Kananen

[57] ABSTRACT

A lens barrel for a camera wherein an outer profile thereof has a reduced dimension in a radial direction of a movable lens and with a lens holding member that can be moved smoothly in a direction of an optical axis of the movable lens held on the barrel. The lens barrel comprises an outer shell having a pair of guide portions provided therein and a lens holding member holding a movable lens thereon. The lens holding member has a pair of guide portions provided at the opposite locations thereof with respect to the optical axis and is supported at the guide portions thereof for sliding movement on the guide portions of the outer shell. The lens barrel further comprises an actuator including a coil securely mounted on the lens holding member and a magnet securely mounted on the outer shell. The coil and magnet are disposed coaxially to each other around the optical axis. Position detecting means is disposed in a spaced relationship by substantially equal distances from the guide portions of the lens holding member and detects a position of the lens holding member with respect to the outer shell.

16 Claims, 7 Drawing Sheets

LENS BARREL FOR CAMERA

BACKGROUND OF THE INVENTION

1. Field of the Invention

This invention relates to a novel lens barrel for a camera. More particularly, this invention relates to a lens barrel for a camera which includes an electromagnetic driving means for moving a movable lens and a position detecting means for detecting a position of the movable lens. This invention provides a novel lens barrel for a camera wherein an outer shell can be made small in size and configured such that it is free from a partial radial protrusion from the lens barrel by providing a specific arrangement of the driving means and/or the position detecting means. The arrangement does not provide, when the movable lens is moved, such a moment that will cause an inclination of an optical axis of the movable lens.

2. Description of the Prior Art

A lens barrel for a camera having an automatic focusing function or an electrically driven zooming function includes a driving means for driving a movable lens for focusing, or another movable lens for zooming to move in a direction of an optical axis of the lens. Such driving means frequently employs an electromagnetically-driven actuator which includes a coil and a magnet.

Figure 8:
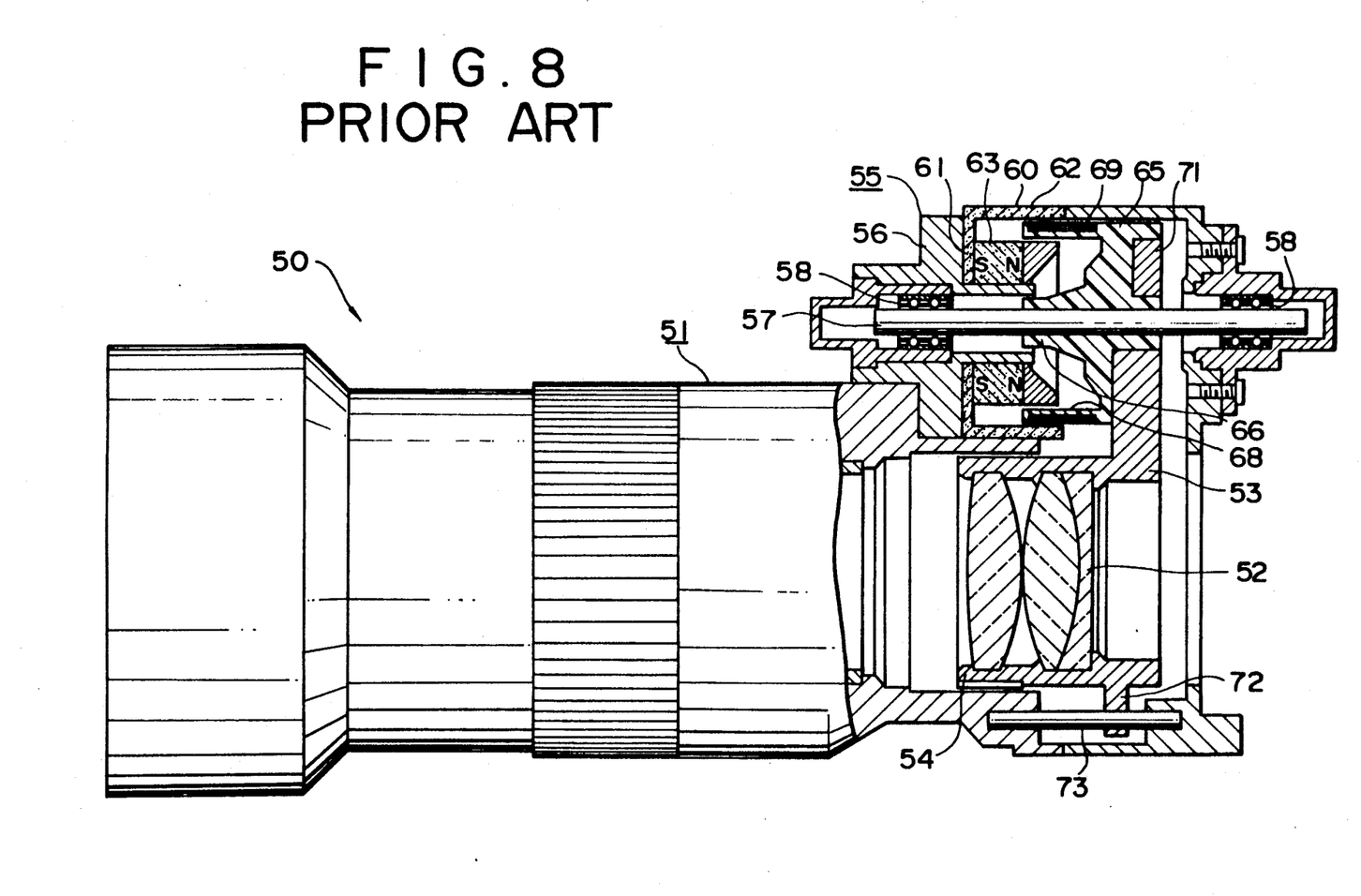
FIG. 8 is a side elevational view, partly in section, showing a conventional lens barrel for a camera.

An exemplary conventional lens barrel which includes such an actuator as described above is disclosed, for example, in Japanese Patent Laid-Open Application No. 1-196011 and is shown in FIG. 8. Referring to FIG. 8, the conventional lens barrel generally denoted at 50 includes an outer shell 51 having a substantially cylindrical profile. The outer shell 51 has a master lens 52 and some other required lenses (not shown) disposed in the inside of the shell such that the lenses have a common optical axis. The master lens 52 is held on a substantially cylindrical lens holding portion 54 of a lens holding member 53.

The lens holding member 53 is moved by an actuator 55. The actuator 55 includes a housing 56 which is mounted on an outer periphery of the outer shell 51 such that most of the actuator is projected sidewardly from the outer shell 51 and an inner space defined by the actuator 55 is defined contiguously with an inner space of the outer shell 51. A sliding shaft 57 is supported at its opposite end portions thereof for sliding movement by means of a pair of bearings 58 secured to the opposite front and rear end portions of the housing 56 and extends in a direction parallel to the optical axis of the master lens 52. A yoke 60 is secured to the housing 56 and has a disk portion 61, a cylindrical portion 62 which extends rearwardly from an outer circumferential edge of the disk portion 61, and a magnet 63 having a substantially ring-like profile is mounted on a rear face of the disk portion 61 of the yoke 60 in a coaxial relationship with the cylindrical portion 62. The yoke 60 is secured at its disk portion 61 to the housing 56 such that the magnet 63 and the cylindrical portion 62 of the yoke 60 surround a portion adjacent the front end of the sliding shaft 52. A coil bobbin 65 having a hub portion 66 and a coaxial cylindrical coil winding portion 68 is secured at the hub portion 66 thereof in an outwardly fitted condition to the sliding shaft 56. A coil 69 is wound on an outer periphery of the coil mounting portion 68 of the coil bobbin 65 and is positioned corresponding to a location between the cylindrical portion 62 of the yoke 60 and the magnet 63. The lens holding member 53 is secured, at a connecting portion 71 extending from the lens holding portion 54, to a rear face of the coil bobbin 65, and is supported at an arm 72 of the member 53 for sliding movement on a guide shaft 73 secured to the outer shell 51.

Thus, if a driving electric current is supplied to the coil 69, a moving force is exerted on the sliding shaft 57 in accordance with a direction of flow of the driving electric current. Consequently, the coil bobbin 65, the sliding shaft 57 and the lens holding member 53 are integrally moved forwardly or rearwardly (leftwardly or rightwardly in FIG. 8) thereby to move the master lens 52.

With a lens barrel 50 as described above, since the actuator 55 for moving the master lens 52 is positioned such that it projects radially sidewardly from the outer periphery of the outer shell 51, i.e., toward the top of FIG. 8, the outer profile of the lens barrel 50 will have a partial but significant protrusion caused by the actuator 55. Moreover, since a cover is provided on the actuator 55, the projection of the protrusion is unexpectedly great. Thus, there is a problem in that the dimension of the lens system of the lens barrel 50 in a radial direction is considerably greater in dimension compared with a radial dimension of a maximum diameter of the lens system.

Such a protrusion of the lens barrel 50 as described above adversely affects use of the camera since both holding the camera and operation of various operating members disposed on the outer periphery of the lens barrel are made difficult.

Furthermore, since the moving force produced on the coil 69 is applied to the connecting portion 71 of the lens holding member 53, i.e., the portion which is projected sidewardly from the lens holding portion 54 on which the movable lens 52 is held, movement of the lens holding member 53 produces a moment on the lens holding member. Thus, there is a problem that movement of the lens holding member 53 is made to feel heavier, or that the optical axis of the movable lens 52 is inclined by such moment.

SUMMARY OF THE INVENTION

It is an object of the present invention to provide a lens barrel for a camera wherein an outer profile thereof has a reduced dimension in a radial direction of a movable lens.

It is another object of the present invention to provide a lens barrel for a camera which has no protrusion or only a small protrusion in an outer profile of the lens barrel.

It is a further object of the present invention to provide a lens barrel for a camera wherein a lens holding member can be moved smoothly in a direction of an optical axis of a movable lens held on the lens holding member.

In order to attain these and other objects according to the present invention, there is provided a lens barrel for a camera which comprises an outer shell having a pair of guide portions provided in the inside thereof; a lens holding member holding a movable lens thereon, the lens holding member having a pair of guide portions provided substantially at opposite locations with respect to an optical axis of the movable lens, the lens holding member being supported at the guide portions thereof for sliding movement on the guide portions of the outer shell; an actuator including a coil securely mounted on the lens holding member and a magnet securely mounted on the outer shell, the coil and magnet being disposed coaxially with each other about the optical axis of the movable lens; and position detecting means disposed in a spaced relationship at substantially equal distances from the two guide portions of the lens holding member for detecting a position of the lens holding member with respect to the outer shell.

With the lens barrel for a camera according to the invention, the dimension of a space within the outer shell in a radial direction of the movable lens, in which space the movable lens and the actuator for moving the movable lens are disposed, is only a little greater than the diameter of the movable lens. In addition, the guide portions of the outer shell and lens holding member and the position detecting means are distributed in an appropriately dispersed condition around the optical axis of the movable lens. Consequently, the dimension of the lens barrel in a radial direction of the movable lens can be decreased considerably. Further, the lens barrel can have an outer profile which has no partial protrusion or no significant partial protrusion which is superior in design and appearance, and is convenient for use of the lens barrel. Furthermore, a moving force exerted on the coil or the magnet which may be a movable component of the actuator is applied uniformly to an entire portion of the lens holding member which is provided in such a manner as to surround the movable lens. Consequently, when the lens holding member is moved, no moment is produced which acts to incline the lens holding member with respect to the direction of such movement, that is, in the direction of the optical axis of the movable lens. Accordingly, the lens holding member can be moved smoothly in the direction of the optical axis of the movable lens. The above and other objects, features and advantages of the present invention will become apparent from the following description and the appended claims, taken in conjunction with the accompanying drawings in which like parts or elements are denoted by like reference characters.

DETAILED DESCRIPTION OF THE PREFERRED EMBODIMENT

Figure 1:
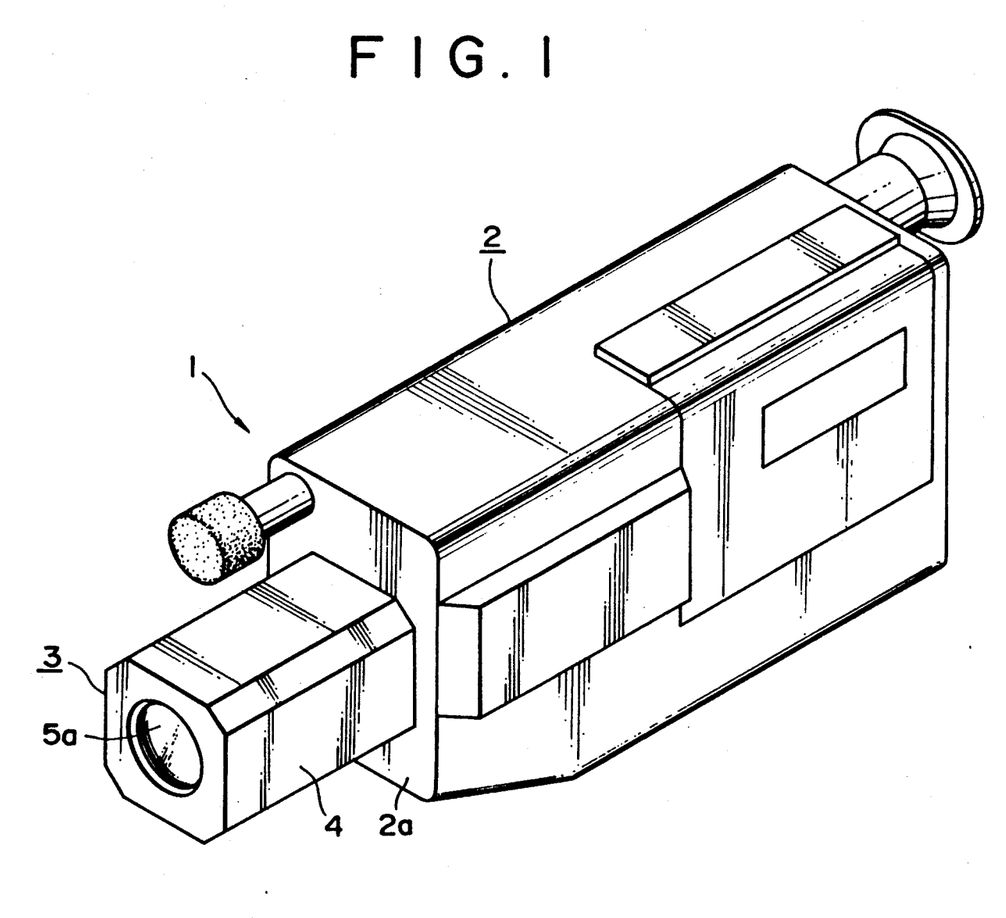
FIG. 1 is a perspective view of a video camera in which the lens barrel of FIG. 2, according to the invention, is incorporated.

Referring first to FIG. 1, a video camera 1 includes a camera body 2 in which a lens barrel 3 according to the present invention is incorporated. The lens barrel 3 includes an outer shell 4 having a generally square, prism-like outer profile elongated in forward and reverse directions of the camera 1. The lens barrel 3 extends forwardly from a front end face 2a of the camera body 2, terminating in an outer lens 5a.

Figure 2:
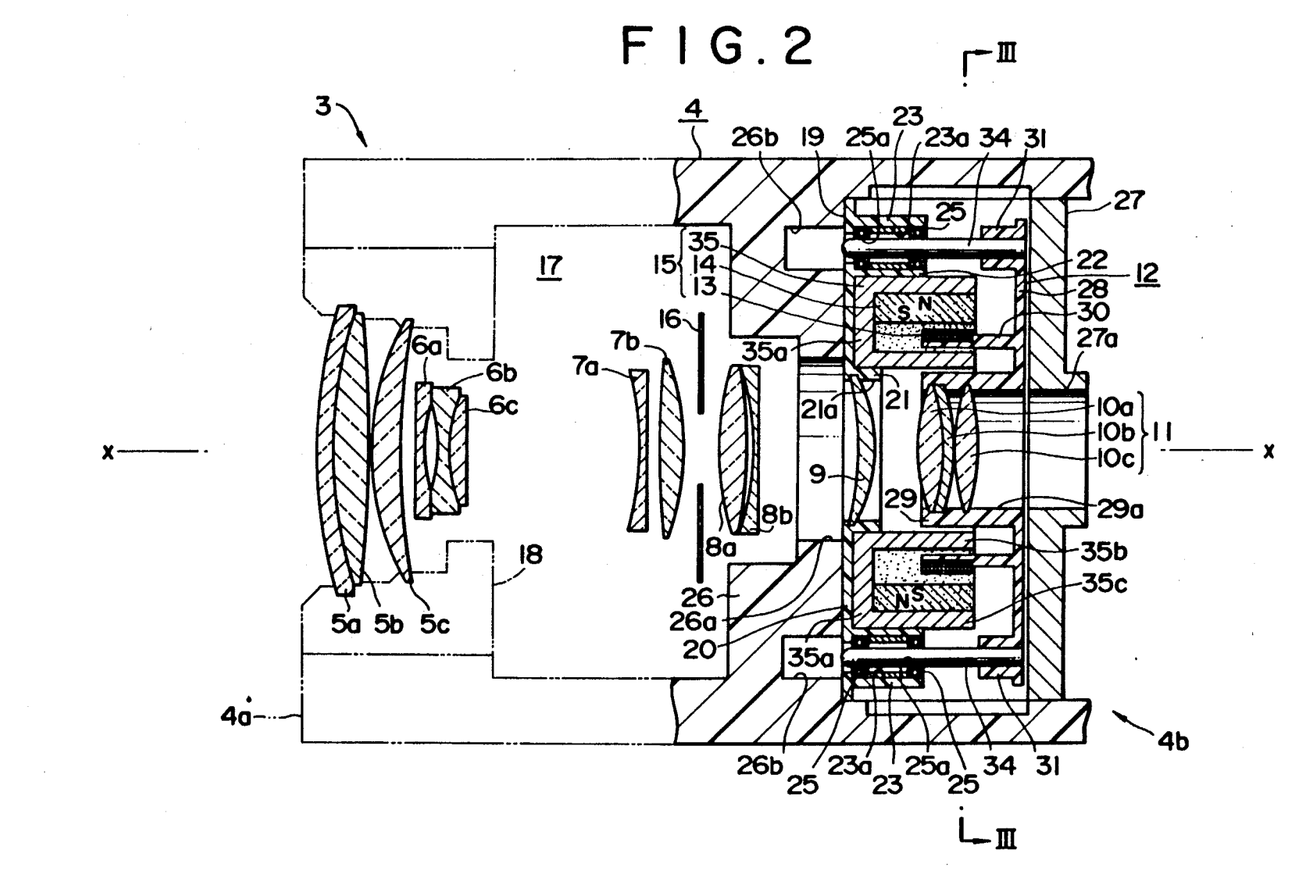
FIG. 2 is a vertical sectional view showing a preferred embodiment of a lens barrel of the present invention.

Referring now to FIG. 2, the outer shell 4 of the lens barrel 3 has a large number of lenses 5a, 5b, 5c, 6a, 6b, 6c, 7a, 7b, 8a, 8b, 9, 10a, 10b, and 10c disposed in this order from the front on the inside of the shell 4, generally along an optical axis x—x of the lens barrel 3, from the front to the rear of the lens barrel. The lenses 5a to 10c individually have predetermined light controlling functions and have a common optical axis x—x. A zooming lens system includes the lenses 5a, 5b, 5c, 6a, 6b, 6c, 7a, and 7b while a focusing lens system includes the other lenses 8a, 8b, 9, 10a, 10b, and 10c, and the lenses 6a, 6b, and 6c serve as a movable lens for the zooming.

A lens group 11 including the three rear side lenses 10a, 10b, and 10c serves as a so-called master lens system 11. The master lens system 11 provides a movable lens for focusing the camera 1. The master lens system 11 is held on a lens holding member 12 supported for movement in both forward and backward directions along the axis x—x in the outer shell 4 of the lens barrel. The master lens system 11 is moved in the forward or the backward direction by an actuator 15 which includes a coil 13 and a magnet 14.

An aperture diaphragm 16 is located between the lenses 7b and 8a. A tape cassette loading section in which a tape cassette is to be removably loaded, a tape feeding mechanism, a recording means for converting an optical image caught by the lens system into an electric signal and recording the electric signal magnetically onto a magnetic tape of a tape cassette and so forth are provided in the inside of the camera body 2, but are not shown.

Figure 3:
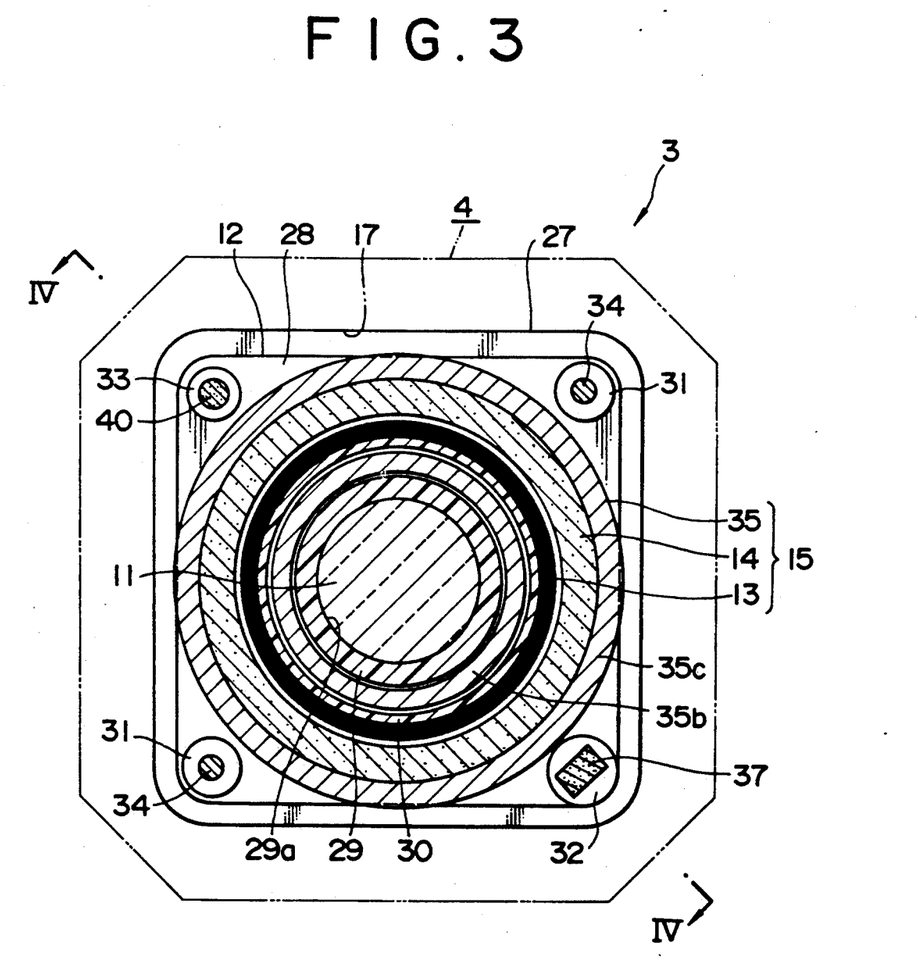
FIG. 3 is a sectional view taken along line III—III of FIG. 2.
Figure 4:
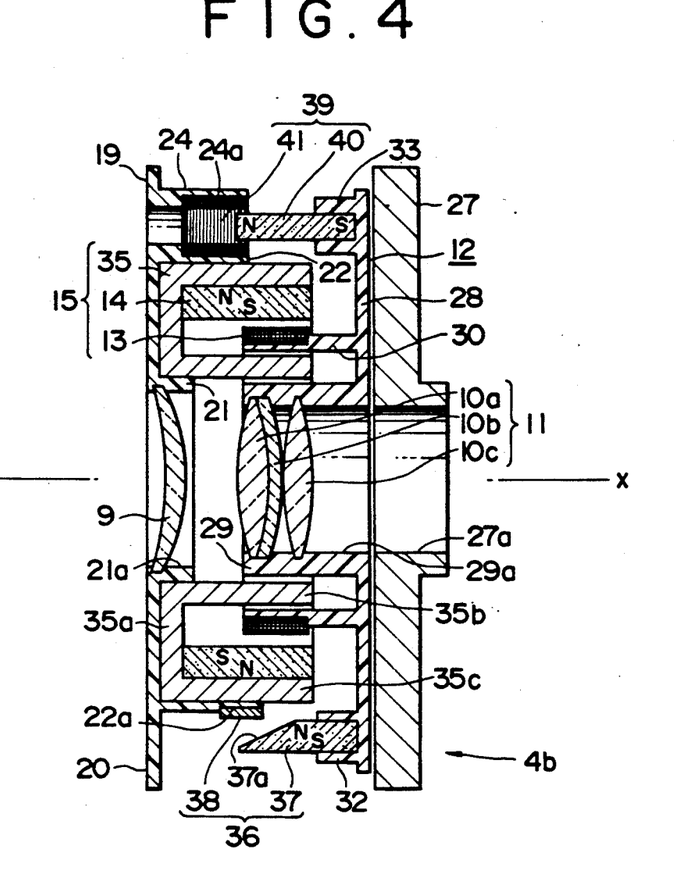
FIG. 4 is a sectional view taken along line IV—IV of FIG. 3.

Referring also to FIGS. 2 and 3, the outer shell 4 of the lens barrel 3 has a generally square, prism-like outer profile as described defining a space 17 formed therein which is open to the opposite front and rear sides 4a, 4b of the outer shell 4. The space 17 has a substantially square sectional shape in a plane perpendicular to the optical axis x—x, as best seen in FIG. 3. The lenses 5a, 5b, and 5c are held on a fixed lens tube 18 fixedly located at an inwardly fitted position at a front end portion of the space 17. The lenses 7a and 7b and the lenses 8a and 8b are individually held on a pair of fixed lens tubes (not shown) disposed at intermediate locations in the space 17. Further, the movable lenses 6a, 6b, and 6c for zooming are supported for movement in both forward and backward directions on a guide shaft (not shown) secured to the outer shell 4. Furthermore, the lens 9 is held on a front side support member 19 which will be hereinafter described.

Referring now to FIGS. 2 to 6, the lens holding member 12, the actuator 15, and various detecting means which will be hereinafter described are supported on a support member 19. The support member 19 is made of a synthetic resin material and has formed in an integral relationship thereon a base portion 20 which is in the form of a plate of a substantially square shape, a pair of annular walls 21 and 22 which extend in a coaxial relationship from a rear face of the base portion 20, a pair of bearing portions 23 which extend generally in parallel to the annular walls 21 and 22 from the rear face of the base portion 20, and a single detecting member mounting portion 24 which also extends in parallel to the annular walls 21 and 22 from the rear face of the base portion 20. The inner side annular wall 21 of the support member 19 extends rearwardly from a central portion of the base portion 20 and has a center bore 21a formed therein which is open at a front end thereof to a front face of the base portion 20 and serves as a light passing opening 21a through which light passes. The lens 9 is disposed in the light passing opening 21a.

The outer side annular wall 22 of the support member 19 has a diameter slightly smaller than a dimension of each side of the square base portion 20 of the support member 19, and the bearing portions 23 and detecting member mounting portion 24 have tubular profiles which are elongated in the forward and backward directions. The bearing portions 23 are projected rearwardly from a pair of corner portions among the four corner portions of the square base portion 20 which are positioned at diametrically opposite positions with respect to the light passing opening 21a, that is, the right upper corner portion and the left lower portion as viewed from the front, while the detecting member mounting portion 24 is projected rearwardly from the left upper corner portion of the square base portion 20. The bearing portions 23 and the detecting member mounting portion 24 of the support base 19 have inner bores or axial openings 23a and 24a formed therein such that they are open to the front face of the base portion 20.

Figure 5:
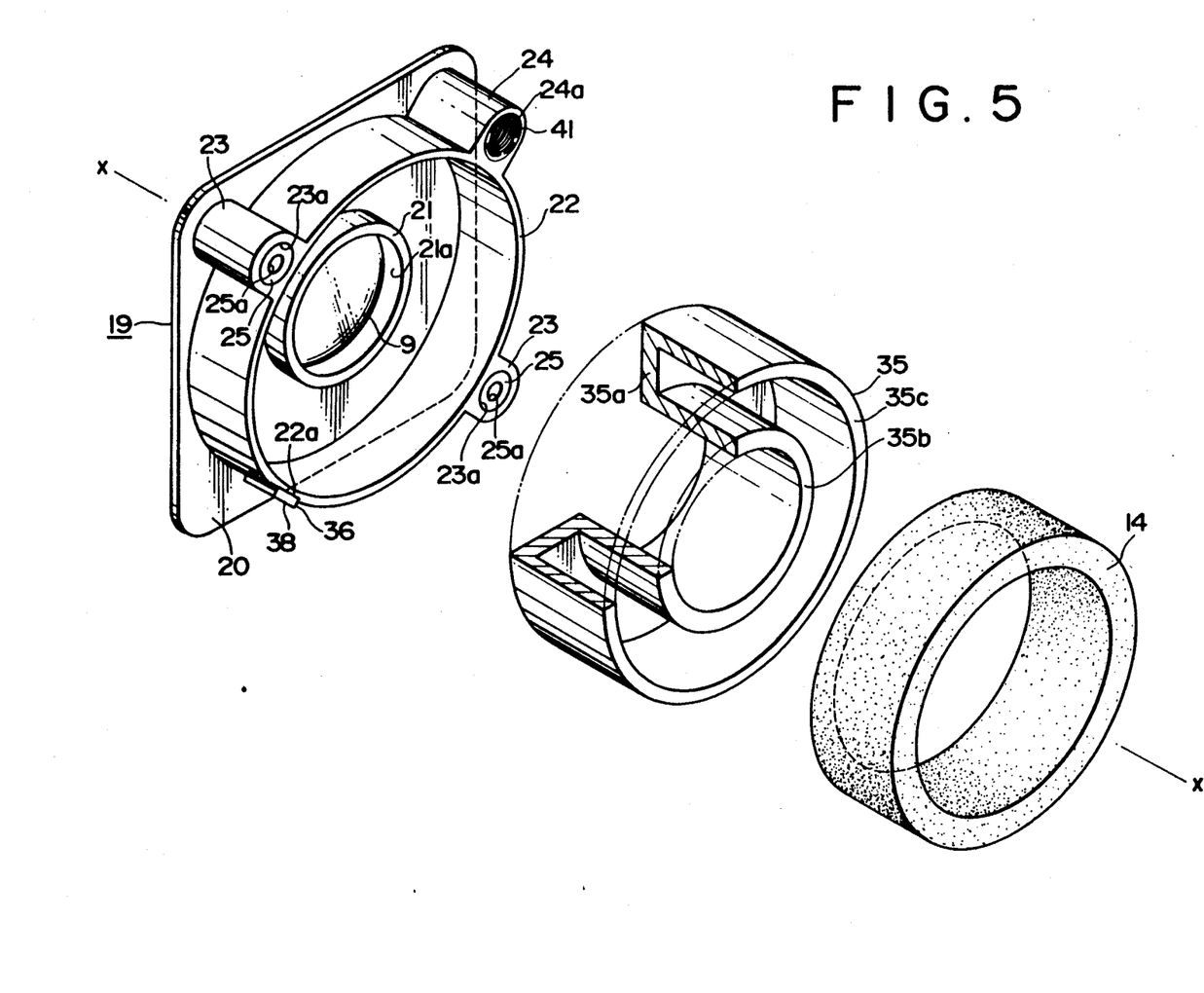
FIG. 5 is a fragmentary, exploded, perspective view, partly cut away, showing a support base, a yoke and a magnet of the lens barrel of FIG. 2.

A pair of cylindrical bearing metal members 25 are force fitted in and secured to the opposite front and rear ends of each of the openings 23a of the bearing portions 23 of the support base 19.

A mounting recess or groove 22a is formed on an outer periphery of the annular wall 22 at a location substantially opposite to the detecting member mounting portion 24 with respect to the axis of the light passing hole 21a.

Referring to FIG. 2, the outer shell 4 has an intermediate wall 26 formed at a substantially middle location of the outer shell 4 when viewed in the forward and backward directions. The intermediate wall 26 is positioned to divide the inner space 17 of the outer shell 4 into two portions in the forward and rearward directions. The base portion 20 of the support member 19 is secured to a rear face of the intermediate wall 26 by suitable securing means such as, for example, a fastening screw.

A light passing opening 26a is formed substantially at a central portion of the intermediate wall 26 of the outer shell 4 and a pair of holes 26b are formed on the rear face of the intermediate wall 26 to communicate with the inner bores 23a of the bearing portions 23 of the support member 19.

Referring now to FIGS. 2, 3, 4, and 6, a rear wall plate 27 is formed as a square plate having a size which is substantially the same as the base portion 20 of the support base 19. A light passing opening 27a is formed at a central portion of the rear wall plate 27. The rear wall plate 27 is disposed at a rear end portion of the space 17 in a spaced relationship by a predetermined distance from the support member 19 and is secured to the outer shell 4 by suitable securing means, not shown.

The lens holding member 12 is made of a synthetic resin and has a main portion 28 formed in an integral relationship thereon. The main portion 28 of the lens holding member 12 is in the form of a substantially square plate which is substantially smaller than the rear wall plate 27. A lens holding portion 29 and a coil bobbin 30 are projected in a coaxial relationship with each other from a front face of the main portion 28. A pair of mounting hubs 31 and a pair of detecting member mounting portions 32 and 33 are also projected from the front face of the main portion 28. The lens holding portion 29 and coil bobbin 30 have substantially cylindrical profiles which are small in axial length compared with the magnitude of the diameter. The lens holding portion 29 is projected forwardly from a central portion of the main portion 28. An inner bore or axial opening 29a is formed in the lens holding portion 29 of the lens holding member 12 as a light passing hole which is opened at a rear face thereof to the rear face of the main portion 28. The master lens 11 is held on the lens holding portion 29 of the lens holding member.

Figure 6:
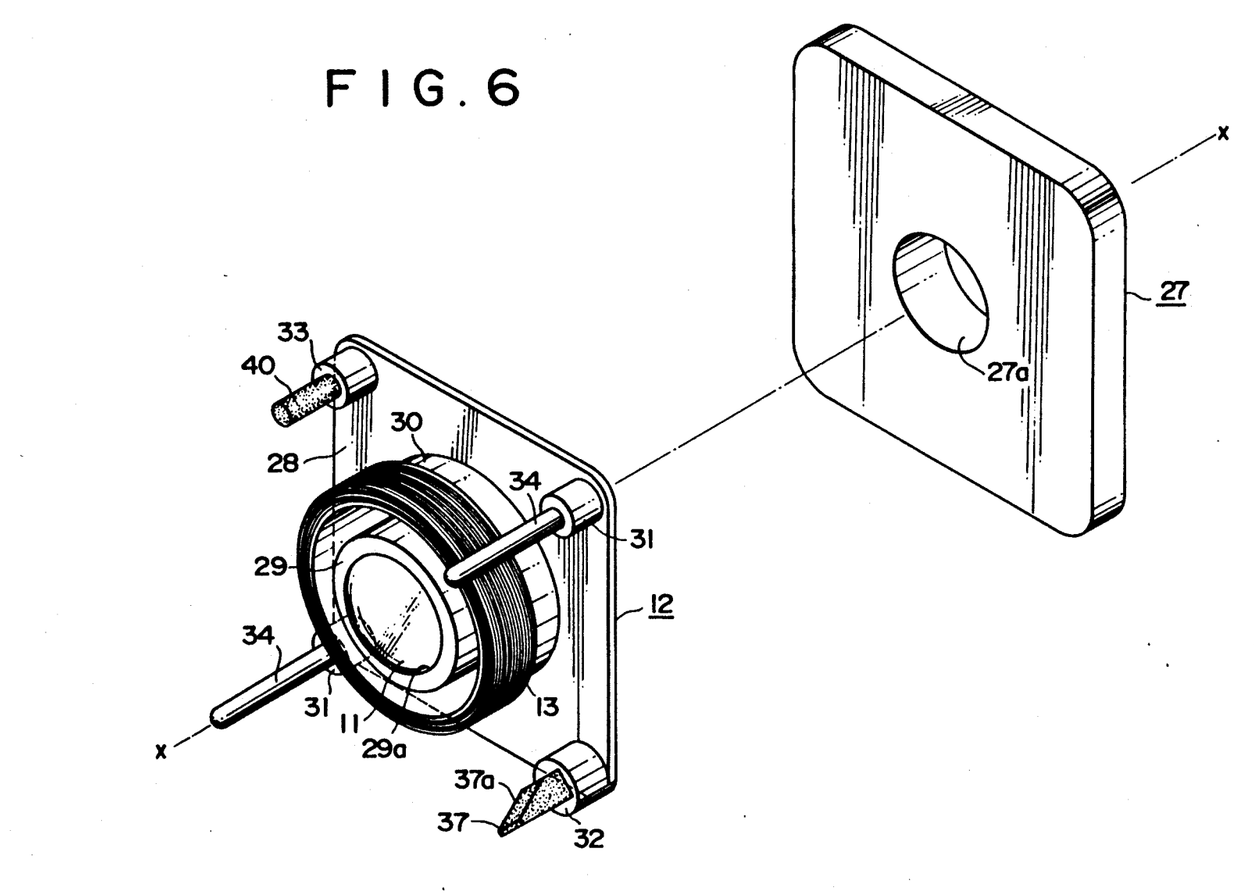
FIG. 6 is a fragmentary, exploded, perspective view showing a rear wall plate and a lens holding member of the lens barrel of FIG. 2.

A pair of mounting hubs 31 are individually disposed at the right upper corner portion and the left lower corner portion of the square main portion 28 of the lens holding member 12, and a pair of sliding shafts 34 are secured at rear ends thereof in an embedded condition to the mounting hubs 31 of the lens holding member 12. The sliding shafts 34 are thus projected forwardly in parallel to each other from diametrically opposite corner portions of the lens holding member 12, as best seen in FIG. 3. A pair of sliding shafts 34 are fitted for sliding movement in corresponding openings 25a formed in the bearing materials 25 securely fitted in the bearing portions 23 of the support base 19.

Thus, the lens holding member 12 is supported for movement in a direction parallel to the optical axis x—x between the support base 19 and the rear wall plate 27.

It is to be noted that the detecting member mounting portions 32 and 33 are individually disposed at the two right lower and left upper corner portions of the main portion 28 of the lens holding member 12.

Referring now to FIGS. 2 to 6, the actuator 15 is made from a yoke body 35 supported on the support member 19, the magnet 14 supported on the yoke body 35, and the coil 13 supported on the lens holding member 12.

The yoke body 35 is generally U-shaped in cross section and made of a metal material having a high permeability. The yoke body 25 includes an intermediate yoke portion 35a having a substantially ring-shaped profile, a cylindrical inner side yoke portion 35b integrally extending rearwardly from an inner circumferential edge of the intermediate yoke portion 35a, and an outer side yoke portion 35c integrally extending rearwardly from an outer circumferential edge of the intermediate yoke portion 35a. The yoke body 35 is secured to the base portion 20 of the support member 19 such that a substantially front half portion thereof is positioned between the two annular walls 21 and 22 of the support member 19.

Meanwhile, the magnet 24 has a cylindrical profile which is short in an axial direction and is magnetized such that the opposite magnetic poles may be provided on inner and outer peripheries thereof. The magnet 24 is secured in an inwardly fitted condition to the outer side yoke portion 35c of the yoke body 35 of the actuator 15.

The coil 13 is wound around a front half portion of the outer periphery of the coil bobbin 30 of the lens holding member 12 and is positioned in a slightly spaced relationship from and between the inner side yoke portion 35b of the yoke body 35 and the magnet 14.

A closed magnetic path, on which the coil 13 is positioned, along which magnetic fluxes going out from the magnet 14 pass, that is, a closed magnetic path along which such magnetic fluxes pass in the route of, for example, the magnet 14 to the outer side yoke 35c to the intermediate yoke 35a to the inner side yoke 35b to the magnet 14, is formed by the magnet 14 and the yoke body 35.

Accordingly, if a driving electric current is supplied to the coil 13, then magnetic fluxes are generated in a direction in accordance with a direction of the driving electric current. Consequently, a moving force is exerted in the forward direction or the rearward direction on the coil 13. By such moving force, the lens holding member 12 is moved in an integral relationship with the master lens 11.

The lens barrel 3 further includes a position detecting means 36 for detecting a position of the lens holding member 12, or, in other words, a position of the master lens 11. The position detecting means 36 includes an inclined magnet 37 mounted on the lens holding member 12 and a Hall effect element 38 mounted on the support base 19.

The inclined magnet 37 has a rectangular section in a plane perpendicular to a longitudinal direction thereof and is supported at a rear end portion thereof in an embedded condition on the right lower detecting member mounting portion 32 of the lens holding member 12. A front half portion 37a of a side face of the inclined magnet 37 opposite to the optical axis x—x is inclined such that it is spaced further away from the optical axis x—x toward the front end thereof.

The Hall effect element 38 is of the linear type and is mounted in the mounting recess 22a formed in the annular wall 22 of the support base 19. The inclined face 37a of the inclined magnet 37 is opposed to the Hall effect element 38. Accordingly, if the lens holding member 12 is moved, then the distance between the inclined magnet 37 and the Hall effect element 38 is varied to vary the density of magnetic fluxes which emanate from the inclined magnet 37 and reach the Hall effect element 38. Consequently, a voltage corresponding to the magnetic flux density is then outputted from the Hall effect element 38. Thus, a position of the lens holding member 12 is detected by detecting such voltage.

The lens barrel 3 further includes speed detecting means 39 for detecting a speed of movement of the lens holding member 12 in order to control its speed. The speed detecting means 39 includes a moving magnet 40 provided on the lens holding member 12 and a detecting coil 41 provided on the support base. The moving magnet 40 has a substantially cylindrical profile and is magnetized such that the opposite magnetic poles are provided at the opposite longitudinal ends thereof. The moving magnet 40 is supported at a longitudinal end thereof on the left upper detecting member mounting portion 33 of the lens holding member 12. Meanwhile, the detecting coil 41 is mounted in an inwardly fitted condition in the recess 24a of the detecting member mounting portion 24 of the support member 19, and a front end portion of the moving magnet 40 is positioned in the inside of the detecting coil 41. Accordingly, if the lens holding member 12 is moved, then the moving magnet 40 is moved in an integral relationship with the lens holding member 12. Consequently, an electric current corresponding to the speed of such movement flows in the detecting coil 41. The speed of movement of the lens holding member 12 is thus detected by detecting a value of the electric current. When the lens holding member 12 is moved so that the master lens 11 approaches its focused position, the moving speed of the lens holding member 12 is controlled so that it may be dropped, and consequently, no hunting will be caused upon focusing.

Figure 7:
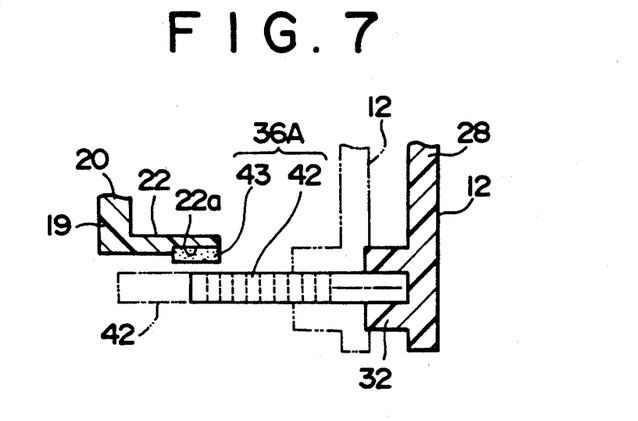
FIG. 7 is an enlarged sectional view showing a modification to the position detecting means of the lens barrel of FIG. 2.

Referring now to FIG. 7. there is shown a modification to the position detecting means 36 described above. The position detecting means denoted at 36A in FIG. 7 employs a moving magnet 42 of the alternately magnetized type in place of the inclined magnet 37. In particular, the moving magnet 42 is magnetized such that opposite polarity magnetic poles are formed alternately along a longitudinal direction thereof. Further, a magneto-resistance effect element 43 is mounted, in place of the Hall effect element 38, in a mounting recess 22a of an annular wall 22 of a support base 19. Accordingly, if the moving magnet 42 is moved corresponding to movement of the lens holding member 42, the magnetic flux density reaching the magnetic-resistance effect element 43 is varied to vary the reluctance value indicated by the magneto-resistance effect element 43. Consequently, a current position of the lens holding member 12 can be detected by counting such variations.

Further, a potentiometer may otherwise be employed as a position sensor in place of the position detecting means 36 or 36A.

While the sliding shaft in the embodiments described is secured to the lens holding member and is supported for sliding movement on the bearing portions provided on the outer shell, alternatively a guide shaft may be secured to the outer shell while the lens holding member is supported for sliding movement on the guide shaft.

Further, while the speed detecting means for controlling the moving speed of the movable lens in the embodiments described above is disposed substantially on the opposite side of the position detecting means with respect to the optical axis of the movable lens, such disposition provides an arrangement of the two guided portions and two guiding portions and the position detecting means and speed detecting means at the four corner portions of the square shape around the optical axis of the movable lens. Accordingly, required members can be disposed in a high density in a cylindrical spacing having a diameter only a little greater than the diameter of the movable lens or in a prism-shaped spacing having a square cross section having a side substantially equal to the diameter of the movable lens. Consequently, the outer profile of the lens barrel can be further reduced in size while maintaining the required functions.

Furthermore, while a magnetic sensor is employed as the position detecting means in the embodiment described above and is disposed outside the outside yoke of the actuator, that is, the yoke disposed in such a manner as to surround the coil and the magnet, such disposition is effective to prevent the magnetic sensor from being influenced by magnetic fluxes produced by the actuator. Accordingly, position detection can be performed with a high degree of accuracy and free from noises.

Having now fully described the invention, It will be apparent to one of ordinary skill in the art that many changes and modifications can be made thereto without departing from the spirit and scope of the invention as set forth herein.

What is claimed is:

1. A lens barrel for a camera, comprising:

an outer shell having a pair of guide portions provided at an inside thereof;

a lens holding member holding a movable lens thereon, said lens holding member having a pair of guide portions provided substantially at opposite locations thereof with respect to an optical axis of said movable lens, said lens holding member being supported at said guide portions thereof for sliding movement on said guide portions of said outer shell;

an actuator, for moving said lens holding member, including a coil securely mounted on said lens holding member and a magnet securely mounted on said outer shell, said coil and magnet being disposed coaxially with each other about the optical axis of said movable lens;

a position detecting means spaced by substantially equal distances from said two guide portions of said lens holding member for detecting a position of said lens holding member with respect to said outer shell; and a moving speed detecting means for detecting a speed of movement of said lens holding member, said moving speed detecting means being provided at a location spaced at substantially equal distances from said guide portions remote from said position detecting means.

2. A lens barrel for a camera according to claims 1, wherein said outer shell has a substantially square outer profile elongated in forward and reverse direction of the camera.

3. A lens barrel for a camera according to claim 1, wherein said position detecting means includes an inclined magnet and a Hall effect element.

4. A lens barrel for a camera according to claim 1, wherein said position detecting means includes a moving magnet of the alternately magnetized type and a magneto-resistance effect element.

5. A lens barrel for a camera according to claim 1, wherein said moving speed detecting means includes a moving magnet and a detecting coil.

6. A lens barrel for a camera according to claim 1, further comprising a guide shaft provided integrally with said lens holding member for guiding said lens holding member for sliding movement.

7. A lens barrel for a camera according to claim 1, further comprising a guide shaft secured to said outer shell for guiding said lens holding member for sliding movement.

8. A lens barrel for a camera according to claim 1, wherein focusing operation is performed by movement of said movable lens.

9. A lens barrel for a camera according to claim 1, further comprising a yoke which surrounds said magnet to prevent leakage of magnetic fluxes to said position detecting means.

10. A lens barrel as set forth in claim 1 wherein said speed detecting means includes a moving magnet provided on the lens holding member and a detecting coil provided on a support base.

11. A lens barrel as set forth in claim 10 wherein said moving magnet has a substantially cylindrical profile and is magnetized such that the opposite magnetic poles are provided at the opposite longitudinal ends thereof.

12. A lens barrel as set forth in claim 10 wherein said moving magnet is supported at a longitudinal end thereof on an upper detecting member mounting portion of the lens holding member, and said detecting coil is mounted in a recess of the detecting member mounting portion of the support member.

13. A lens barrel for a camera, comprising: p1 an outer shell having a pair of guide portions provided at an inside thereof;

a lens holding member holding a movable lens thereon, said lens holding member having a pair of guide portions provided substantially at opposite locations thereof with respect to an optical axis of said movable lens, said lens holding member being supported at said guide portions thereof for sliding movement on said guide portions of said outer shell;

an actuator for moving said lens holding member and including a coil securely mounted on said lens holding member and a magnet securely mounted on said outer shell, said coil and magnet being disposed coaxially with each other about the optical axis of said movable lens; and a moving speed detecting means for detecting a speed of movement of said lens holding member, said moving speed detecting means being provided at a location spaced at substantially equal distances from said guide portions.

14. A lens barrel as set forth in claim 13 wherein said speed detecting means includes a moving magnet provided on the lens holding member and a detecting coil provided on a support base.

15. A lens barrel as set forth in claim 13 wherein said moving magnet has a substantially cylindrical profile and is magnetized such that the opposite magnetic poles are provided at the opposite longitudinal ends thereof.

16. A lens barrel as set forth in claim 13 wherein said moving magnet is supported at a longitudinal end thereof on an upper detecting member mounting portion of the lens holding member, and said detecting coil is mounted in a recess of the detecting member mounting portion of the support member.

* * * * *